United States Patent [19]

Takenoya et al.

[11] 4,259,913

[45] Apr. 7, 1981

[54] ELECTRONIC PATTERN CONTROL SEWING MACHINE

[75] Inventors: Hideaki Takenoya, Hachioji; Hachiro Makabe, Fussa, both of Japan

[73] Assignee: Janome Sewing Machine Co. Ltd., Tokyo, Japan

[21] Appl. No.: 41,404

[22] Filed: May 21, 1979

[30] Foreign Application Priority Data

May 25, 1978 [JP] Japan .................................. 53-61667

[51] Int. Cl.³ ............................................. D05B 3/02
[52] U.S. Cl. ............................................... 112/158 E
[58] Field of Search .......... 112/158 E, 121.11, 121.12; 318/567, 569

[56] References Cited

U.S. PATENT DOCUMENTS 4,145,982   3/1979   Kume et al. ...................... 112/158 E

FOREIGN PATENT DOCUMENTS 2825736 12/1978 Fed. Rep. of Germany ....... 112/158 E

Primary Examiner—Peter P. Nerbun
Attorney, Agent, or Firm—Michael J. Striker

[57] ABSTRACT

A sewing machine has stitch forming instrumentalities synchronously operated with the upper drive shaft to produce a variety of stitch patterns using a plurality of manual pattern selecting switches to produce pattern selecting signals specific to the pattern selected in conjunction with a pulse generator which produces a pulse per rotation of the upper shaft which pulse triggers a free-running pulse from an oscillator which are then progressively registered by a counter that addresses a static memory to produce a signal for stopping the operation of the oscillator, and control means for selectively applying the counter contents to the stitch forming instrumentalities.

1 Claim, 5 Drawing Figures

FIG_1

FIG_4

| Address A4 A3 A2 A1 A0 | Data D3 D2 D1 D0 | Pattern Number |
|---|---|---|
| 0 0 0 0 0 | 0 0 0 0 | 1,2,3,4,5 |
| 0 0 0 0 1 | 1 1 1 1 | |
| 0 0 0 1 0 | 1 1 1 1 | |
| 0 0 0 1 1 | 1 1 1 0 | 5 |
| 0 0 1 0 0 | 1 1 1 1 | |
| 0 0 1 0 1 | 0 0 0 1 | 1,2,3,4 |
| 0 0 1 1 0 | 0 0 1 0 | 1,2, 4,5 |
| 0 0 1 1 1 | 1 1 1 1 | |
| 0 1 0 0 0 | 1 1 1 1 | |
| 0 1 0 0 1 | 1 1 1 1 | |
| 0 1 0 1 0 | 1 1 1 1 | |
| 0 1 0 1 1 | 0 1 1 1 | 3 |
| 0 1 1 0 0 | 1 1 1 1 | |
| 0 1 1 0 1 | 0 0 0 1 | 1,2,3,4 |
| 0 1 1 1 0 | 0 1 0 1 | 3, 5 |
| 0 1 1 1 1 | 1 1 1 1 | |
| 1 0 0 0 0 | 0 0 1 0 | 1,2, 4,5 |
| 1 0 0 0 1 | 1 1 1 1 | |
| 1 0 0 1 0 | 1 1 1 1 | |
| 1 0 0 1 1 | 1 1 1 1 | |
| 1 0 1 0 0 | 1 1 1 1 | |
| 1 0 1 0 1 | 0 0 0 1 | 1,2,3,4 |
| 1 0 1 1 0 | 0 0 1 1 | 1, 5 |
| 1 0 1 1 1 | 1 1 1 1 | |
| 1 1 0 0 0 | 0 1 1 0 | 2 |
| 1 1 0 0 1 | 1 1 1 1 | |
| 1 1 0 1 0 | 1 1 1 1 | |
| 1 1 0 1 1 | 0 1 0 0 | 3,4 |
| 1 1 1 0 0 | 1 1 1 1 | |
| 1 1 1 0 1 | 0 0 0 1 | 1,2,3,4 |
| 1 1 1 1 0 | 1 1 1 1 | |
| 1 1 1 1 1 | 1 1 1 1 | |

ELECTRONIC PATTERN CONTROL SEWING MACHINE

BRIEF DESCRIPTION OF THE INVENTION

The invention relates to a sewing machine, and more particularly relates to an electronic pattern control sewing machine which is simple in structure and easy in operation.

Now the widely used pattern sewing machines are generally provided with mechanical memory such as pattern generating cams. With the increasing tendency of customers requiring various stitch patterns, the number of the pattern cams has been increased and also the whole mechanical structure has become more and more complex. As the result, the sewing machine has become much heavier and difficult to operate. On the other hand, a semiconductor memory has come to be used in the sewing machine in place of many pattern cams which are otherwise required. Even in this case, such a memory is not effectively employed in storing the pattern data for controlling the stitch forming instrumentalities of the sewing machine.

The present invention has been provided to eliminate such defects and disadvantages of the prior art. It is a primary object of the invention to provide a sewing machine most effectively utilizing a semiconductor memory which stores pattern data for controlling the stitch forming instrumentalities of the sewing machine.

It is another object of the invention to provide a sewing machine which is simple in structure and easy in operation.

The other features and advantages of the invention will be apparent from the following description of the invention in reference to the preferred embodiment as shown in the attached drawings.

BRIEF DESCRIPTION OF THE DRAWINGS

FIG. 4 is a static memory storing pattern control data employed in this invention and shown in relation to stitch patterns to be formed thereby.

DETAIL DESCRIPTION OF THE INVENTION

Figure 1:
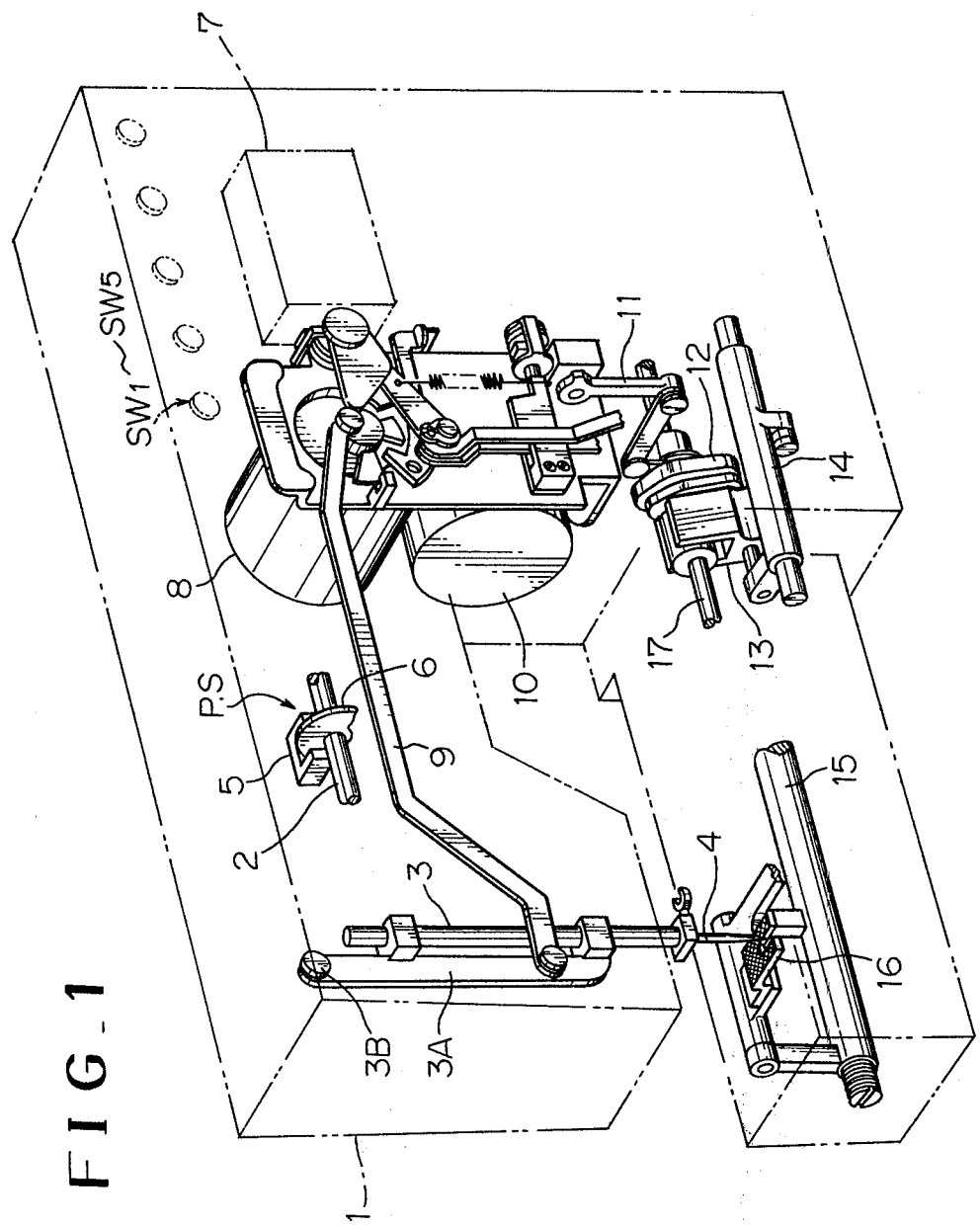
FIG. 1 is a sewing machine of the invention, partially omitted to clearly show the invention.

In reference to FIG. 1, the reference numeral 1 denotes a machine housing in which a drive shaft 2 is rotatably mounted on the machine housing and is rotated by a machine drive motor (not shown). The drive shaft 2 is operatively connected to a needle bar 3 having a needle 4 and is rotated to produce vertically reciprocal motion in the needle bar. P.S. denotes a pulse generator consisting of a U-shape element 5 secured to the machine housing and provided with a light emitting diode and a photosensitive resistor in the manner as generally known, and a light interrupting plate 6 fixedly mounted on the drive shaft 2 for rotation therewith. The pulse generator P.S. is operated to produce an electric signal per rotation of the drive shaft 2 at the rotation phase thereof when the needle comes to a predetermined position above the needle plate. $SW_1$–$SW_5$ are pattern selecting switches to be manually operated by the machine operator. The reference numeral 7 points to a control circuit device of the sewing machine. Pulse motors 8, 10 are mounted on a bracket secured to the machine housing. The pulse motor 8 is connected to a needle bar support 3A through a transmission rod 9. The needle bar support 3A is rotatably mounted on the machine housing by a pivot 3B. The pulse motor 10 is connected to a feed dog 16 through a link 11, a feed adjuster 12, a fork element 13, a connecting link 14 and a rocking shaft 15 which reciprocally moves the feed dog 16 in a horizontel plane. A lower drive shaft 16 is synchronously rotated with the upper drive shaft 2 and drives a loop taker (not shown).

Figure 2:
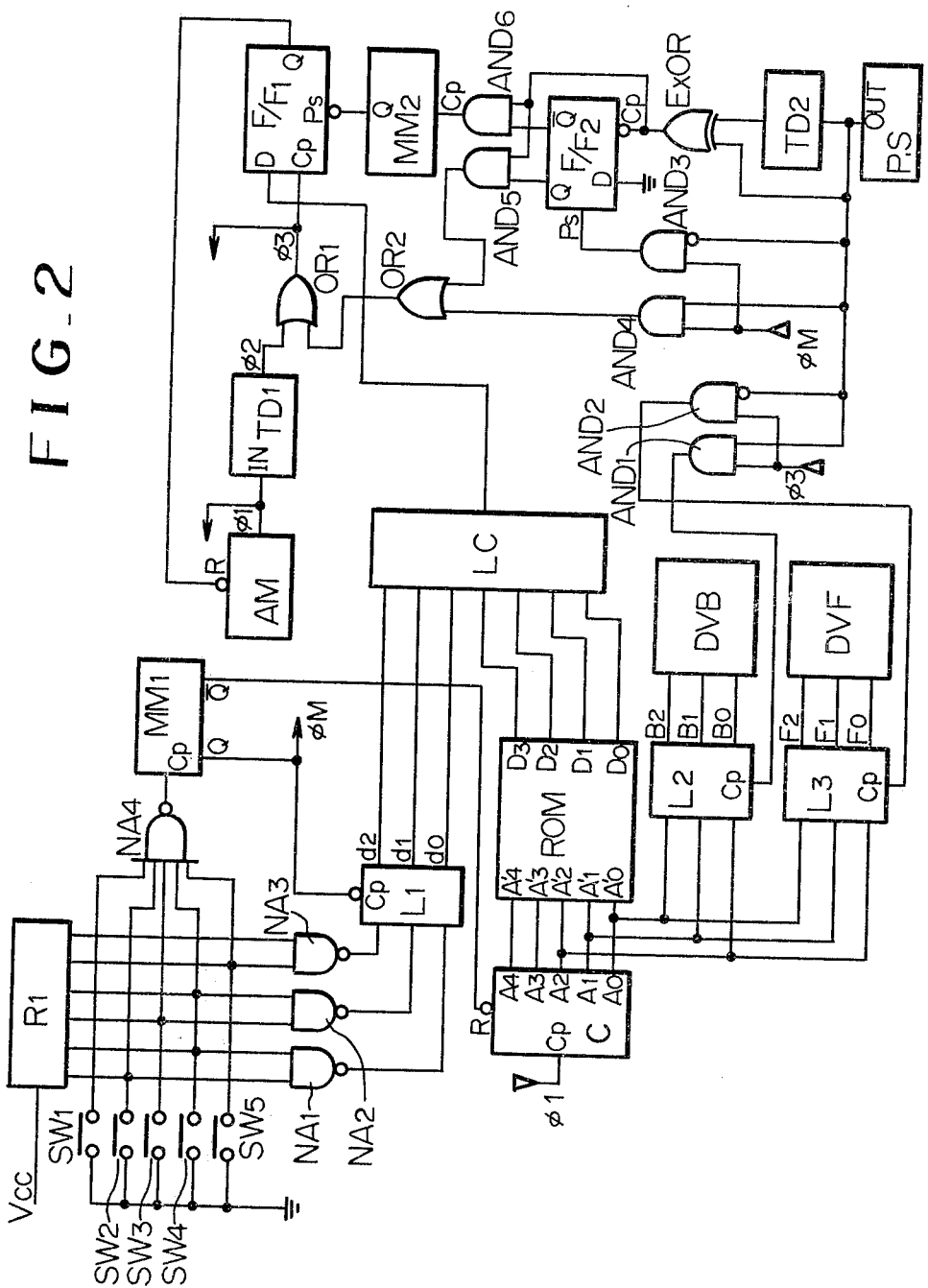
FIG. 2 is an embodiment of a pattern control circuit diagram of the above.
Figure 3:
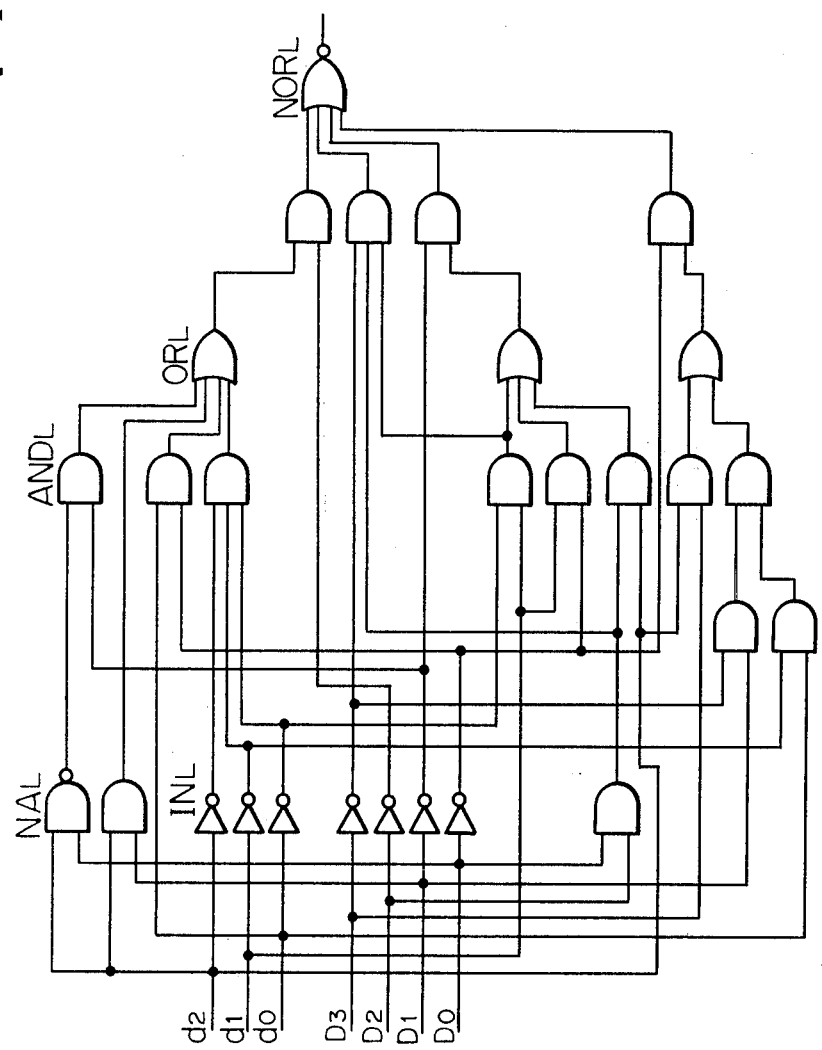
FIG. 3 is a detailed logic circuit (LC) in FIG. 2.

FIG. 2 shows a control circuit, a main part of which is arranged in the control device 7 in FIG. 1. The pattern selecting switches $SW_1$–$SW_5$ are normally opened switches each grounded at one end thereof, and connected at the other end to a trigger terminal Cp of a monostable multivibrator $MM_1$ through a NAND circuit (NA4), and also connected to the input terminals of a latch circuit ($L_1$) through NAND circuits $NA_1$, $NA_2$, $NA_3$ so as to encode the operates conditions of the switches into 0 0 0 - 1 0 0 . The pattern selecting switches $SW_1$–$SW_5$ are also connected to a DC power source Vcc through a limiting resistor $R_1$. The monostable multivibrator $MM_1$ has a true side output terminal Q connected to a trigger terminal Cp of the latch circuit $L_1$ so that the latch circuit $L_1$ may produce the encoded signal at the output terminals $d_2$, $d_1$, $d_0$ thereof when one of the pattern selecting switches $SW_1$–$SW_5$ is operated. A counter C of master-slave type has a reset terminal R connected to a complement side output terminal Q of the monostable multivibrator $MM_1$. The counter C has a 5-bit output terminals $A_0$–$A_4$ connected to the input terminals $A'_0$–$A'_4$ respectively of a static memory ROM. The counter C has an input terminal Cp and produces a progressive code each time a pulse $\phi$ is applied thereto as will be described in detail. In this embodiment, when the code composed of the outputs $A_4$, $A_3$, $A_2$, $A_0$ reaches a code 1 1 1 1 1, that is 31 in the decimal number, it is returned to a code 0 0 0 0 0, that is 0. The lower 3 bits of the code, namely to outputs $A_2$, $A_1$, $A_0$ are connected to the input sides of latch circuits $L_2$, $L_3$. These latch circuits have the output terminals $B_2$, $B_1$, $B_0$ and $F_2$, $F_1$, $F_0$ respectively connected to a needle swing control circuit DVB and a feed control circuit DVF which drive the pulse motors 8 and 10 respectively. The 3-bit output $d_0$–$d_2$ of the latch circuit $L_1$ and the 4-bit output $D_0$–$D_3$ of the static memory ROM are connected to a data terminal D of a flip-flop circuit $F/F_1$ through a logic circuit LC. The logic circuit LC is, as shown in FIG. 3 by way of example, composed of a plurality of AND circuits $AND_L$, OR circuits $OR_L$, NOR circuits $NOR_L$, NAND circuits $NA_L$, inverters $IN_L$, etc., and has 7-bit inputs receiving the data $d_0$–$d_2$ and $D_0$–$D_3$, a specific code of which is to make the logic value 0 at the data terminal D of the flip-flop circuit $F/F_1$. Though not specifically shown, the output Q of the flip-flop circuit $F/F_1$ is reset to 0 when the control power source Vcc is applied. The output Q is connected to a reset terminal R of an astable multivibrator AM. When the logic value is 1 at the output Q of the flip-flop circuit $F/F_1$, the astable multivibrator produces a pulse $\phi_1$. The output $\phi_1$ of the astable multivibrator AM is connected to the input terminal IN of a delay circuit $TD_1$ and to the input terminal Cp of the counter C. The delay circuit $TD_1$ has an output terminal $\phi_2$ connected to one of the input terminals of an OR circuit $OR_1$ which has an output $\phi_3$ connected to the trigger terminal Cp of the flip-flop circuit $F/F_1$.

The pulse generator P.S has an output OUT connected to one of the input terminals of an AND circuit $AND_1$ and also connected to an inverting input terminal of an AND circuit $AND_2$. These AND circuits have the other input terminals connected to receive the output signal $\phi_3$, and have the outputs respectively connected to the trigger terminals Cp, Cp of the latch circuits $L_2$, $L_3$ as shown. The output signal $\phi_3$ of the OR circuit $CR_1$ is made effective to the trigger terminal Cp of the latch circuit $L_2$ which gives a signal to the needle swing control circuit DVB, when the pulse generator P.S has a logic value 1 at a predetermined angular position thereof while the needle 4 is located above the needle plate. On the other hand, when the pulse generator P.S has a logic value 0 at the angular position other than the predetermined angular position, the output signal $\phi_3$ is made effective to the trigger terminal Cp of the latch circuit $L_3$ which gives a signal to the feed control circuit DVF.

$F/F_2$ is a D-type flip-flop circuit having a preset terminal Ps connected to the output of the AND circuit $AND_3$, and having a data terminal D grounded. As the AND circuit $AND_3$ is receiving an output $\phi_M$ of the monostable multivibrator $MM_1$ which detects the Selective operation of the pattern selecting switches $SW_1$–$SW_5$, it is preset when one of the pattern selecting switches is operated when the pulse generator P.S has a logic value 0 in the feed control range thereof. The output terminal OUT of the pulse generator P.S is connected to one of the input terminals of an exclusive OR circuit ExOR and is also connected to the other input terminal of the exclusive OR circuit through a delay circuit $TD_2$. The exclusive OR circuit ExOR produce a pulse at the rising and falling points when the logic values 0 and 1 are switched over in the pulse generator P.S, and the pulse is applied to the trigger terminal Cp of the flip-flop circuit $F/F_2$. The output terminal OUT of the pulse generator P.S is further connected to the input side of an AND circuit $AND_4$ together with the output $\phi_M$ of the monostable multivibrator $MM_1$, and the AND circuit $AND_4$ has an output connected to one of the input terminals of an OR circuit $OR_2$ which has an output connected to the other terminal of the OR circuit $OR_1$. The output of the exclusive circuit ExOR is also connected to the input side of an AND circuit $AND_5$ along with with the true side output Q of the flip-flop circuit $F/F_2$. The output of the AND circuit $AND_5$ is connected to the input side of an OR circuit $OR_2$ along with the output of the AND circuit $AND_4$, and the OR circuit $OR_2$ has an output connected to the other input of the OR circuit $OR_1$. The output of the exclusive circuit ExOR is also connected to the input side of an AND circuit $AND_6$ along with the complement side output $\overline{Q}$ of the flip-flop circuit $F/F_2$. The output of the AND circuit $AND_6$ is connected to a trigger terminal Cp of a monostable multivibrator $MM_2$ which has an output terminal Q connected to the preset terminal $P_S$ of the flip-flop circuit $F/F_1$.

FIG. 4 shows the output data $D_3$, $D_2$, $D_1$, $D_0$ of the static memory ROM each corresponding the address codes $A'_4$, $A'_3$, $A'_2$, $A'_1$, $A'_0$ composed by the input signals $A'_0$–$A'_4$ of the memory, and also shows the pattern numbers 1–5 in correspondence to the specific data which are individually selected by operation of the pattern selecting switches $SW_1$–$SW_5$.

Figure 5:
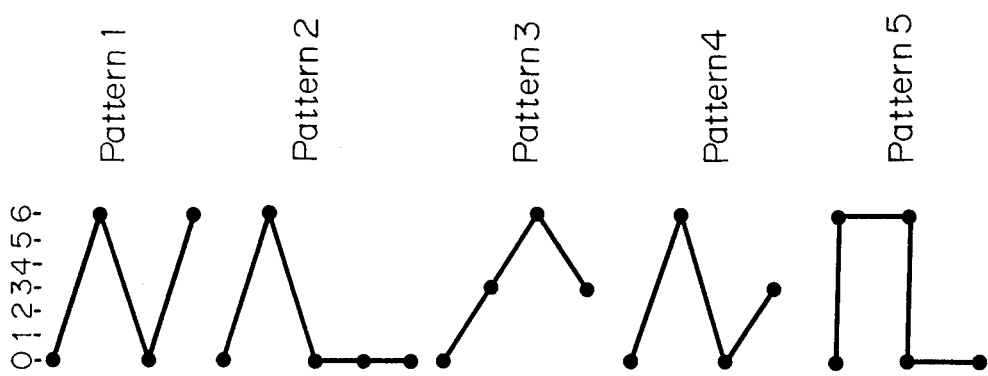
FIG. 5 is a group of stitch patterns by way of example which are actually formed by using the invention.

FIG. 5 shows the stitch patterns 1–5 actually produced by this invention in correspondence to the selective operation of the pattern selecting switches $SW_1$–$SW_5$.

In reference to FIG. 3, the logic circuit LC is so formed as to produce a logic value 0 as the output thereof when the input data $D_3$, $D_2$, $D_1$, $D_0$ are 0 0 0 0 on the condition that one of the patterns 1, 2, 3, 4, 5 is selected. In FIG. 4 when the data are 1 1 1 0, the logic circuit LC produces the logic value 0 as the output on the condition that the selected pattern is number 5. The blank columns show that the corresponding data 1 1 1 1 includes patterns 1–5, and that the logic circuit LC produces a logic value 1 as the output in such a case.

Operation of the control circuit of the invention in FIG. 2 is as follows; If the pattern selecting switch $SW_4$ is pushed, the outputs $d_2$, $d_1$, $d_0$ of the latch circuit $L_1$ become a logic value 0 1 1 1. Simultaneously the counter C is reset and gives the static memory ROM an address 0 0 0 0 0 as shown in FIG. 4, and the output data of the ROM become 0 0 0 0. As the data includes the pattern number 4 in FIG. 4, the output of the logic circuit LC becomes 0. Then if the pulse generator P.S has a logic value 1, the pulse $\phi_3$ is applied to the trigger terminal Cp of the flip-flop $F/F_1$ through the AND circuit $AND_4$. However as the data signal D of the flip-flop circuit $F/F_1$ is 0, the astable multivibrator AM remains to be reset. Then the pulse $\phi_3$ gives the needle swing control circuit DVB the last 3 bits 0 0 0 of the counter output through the AND circuit $AND_1$. If the pattern selecting switch $SW_4$ was pushed when the pulse generator P.S had a logic value 0, the flip-flop circuit $F/F_1$ is preset through the AND circuit $AND_3$. However in this case, there is no rising or falling in the output of the pulse generator P.S, and therefore the pulse $\phi_3$ is not generated. When the sewing machine starts rotation, the pulse generator P.S has the logic value 1, and produces a pulse $\phi_3$ at the rising point of the output. Namely in this invention if the pattern is selected at any rotation phase of the pulse generator P.S, the pattern is selected at the phase when the pulse generator has the logic value 1 for controlling the lateral needle swinging movement.

As the sewing machine is further rotated and the pulse generator P.S has a logic value 0 at the falling thereof, the flip-flop circuit $F/F_1$ is preset and the astable multivibrator AM produce a signal $\phi_1$. Then the output of the counter C becomes 0 0 0 0 1, and the data in FIG. 4 becomes 1 1 1 1. In this instant, the output of the logic circuit LC is 1, and therefore the counter C advances the counts until the output of the logic circuit LC becomes 0. When the address in FIG. 4 becomes 0 0 1 0 1, the output of the logic circuit LC becomes 0, and the flip-flop circuit $F/F_1$ is inverted to stop the astable multivibrator AM and the counter C is stopped, and the last or lower 3 bits are applied to the feed control circuit DVF. Although the latch circuit $L_3$ is latched each time the counter C advances the count, the stitch control circuits DVB, DVF become operative only when the counter stops counting. In such a manner, the selected pattern 4 is progressively formed. As the last address 1 1 1 1 1 in FIG. 4 is followed by the first address 0 0 0 0 0, the same pattern is repeatedly formed.

Namely in this invention, the output code 0 0 0 0 of the memory ROM is used commonly for the patterns 1, 2, 3, 4, 5 as shown in FIG. 4. As the output codes are advanced below, the respective patterns are formed with control of the feed and needle accompanied as shown in FIG. 5. However, with respect to the output code 0 1 1 1 0, it controls the feed for the pattern 5 and controls the needle for the pattern 3. Thus in this invention, the static memory ROM stores a comparatively small number of pattern control data and can produce a large number of stitch patterns. Moreover, since any of the patterns are formed by traversing all the data stored in the memory, the arrangement of the pattern control data is completely free and any data may not be arranged in a specific position for the patterns to be selected.

We claim:

1. A sewing machine having stitch forming instrumentalities operated in synchronism with the upper drive shaft to change the relative positions of the needle and the sewn material to stitch patterns, comprising a plurality of pattern selecting switches ($SW_1$-$SW_5$) manually operated to produce pattern selecting signals each specific to the patterns to be selected; a pulse generator (P.S) producing a pulse per rotation of the upper drive shaft at a predetermined angular position thereof; an oscillator (AM) producing a free-running pulse in response to the pulse from the pulse generator; a counter (C) progressively counting the number of the pulses produced by the oscillator; a static memory (ROM) addressed by the progressive counting of the counter to produce a signal for stopping the operation of the oscillator; and control means for selectively applying the counting contents of the counter to the stitch forming instrumentalities.

* * * * *